(12) United States Patent
Crane

(10) Patent No.: US 6,282,259 B1
(45) Date of Patent: Aug. 28, 2001

(54) X-RAY MIRROR SYSTEM PROVIDING ENHANCED SIGNAL CONCENTRATION

(75) Inventor: Keith Crane, The Woodlands, TX (US)

(73) Assignee: Rigaku/MSC, Inc., The Woodlands, TX (US)

( * ) Notice: Subject to any disclaimer, the term of this patent is extended or adjusted under 35 U.S.C. 154(b) by 0 days.

(21) Appl. No.: 09/394,961

(22) Filed: Sep. 10, 1999

(51) Int. Cl.[7] .................................................. G21K 1/06
(52) U.S. Cl. ............................................................ 378/84
(58) Field of Search .............................. 378/84, 85, 145

(56) References Cited

U.S. PATENT DOCUMENTS 5,615,245 * 3/1997 Hashimoto .............................. 378/85

OTHER PUBLICATIONS

Theory of Image Formation in Combinations of X–Ray Focusing Mirrors, by Y.T. Thathachari, Proceedings of the Indian Academy of Science, A, 37, pp. 41–62, 1953.
X–Ray Optical Systems, Inc., 8 pages, 1995.
Specifications of Double Mirror X–ray Optical System Model MAC–XOS, Enraf Nonius, pp. 1–2, Unknown date.
X–Ray Focusing Mirror, Siemens instruction book, pp. 1–1 –3–20, Unknown date.
Use of a Mirror as the First Optical Component for an Undulator Beamline at the APS, by W. Yu, A. Khounsary, B. Lai, and E. Gluskin; Argonne National Laboratory, pp. 1–12, Sep. 1992.

* cited by examiner

*Primary Examiner*—Craig E. Church

(57) ABSTRACT

A focusing device for x-radiation is disclosed. The device is fabricated from a block of optical material. The block can be monolithic or formed of multiple pieces joined together. A groove is cut into the monolithic block preferably in the form of a "V" groove. The active surfaces of the groove are finished and coated so that they are optically reflective, or can be coated with material forming a multilayer surface so that they are optically diffractive. The active surfaces thereby form two side-by-side mirrors which are preferably at right angles to one another. Means for deforming the groove are provided. The focal length of x-radiation impinging upon the groove is defines as a function of controlled deformation of the groove.

30 Claims, 3 Drawing Sheets

X-RAY MIRROR SYSTEM PROVIDING ENHANCED SIGNAL CONCENTRATION

BACKGROUND OF THE INVENTION

1. Field of the Invention

This invention is directed toward focusing of x-rays, and more particularly directed toward the shaping and optional monochromatizing of x-rays using cooperating mirrors.

2. Background of the Art

Focused and monochromatized x-radiation has numerous applications including high resolution diffraction, protein crystallography, biotechnology, thin film analysis, and micro-focusing for both point-focus laboratory sources and synchrotrons.

Typical x-ray sources emit x-radiation which is not focused or shaped, and which includes a relatively large band width (or wavelength) distribution. A shaped beam can be formed by collimating source emission with mechanical collimators such as slits or shutters. Any radiation not passing through the mechanical collimator is absorbed or scattered, and therefore is lost from the collimated beam.

Two dimensional optics have been used to form a diverted, focused beam of x-radiation. For a given source strength, the intensity of the shaped beam is intensified when compared with a similar beam formed by simple, mechanical collimation. This technique, however, suffers from strong aberrations and mismatched focal lengths. Furthermore, for a given optic, the focal length of the focused beam is fixed, but can be varied by mechanically changing the curvature of the focusing mirror.

Two dimensional optics consisting of multilayer surfaces have been us ed to generate beams of x-radiation falling within a relatively narrow, predetermined wavelengths. Multilayer optics function on the principle of diffraction rather than reflection. For a wavelength, $\lambda$, of x-rays, a given d-spacing multilayer optic diffracts x-rays at a defined angle. This relationship, known as Bragg's law, equates $\lambda = 2\,d\sin\theta$, where $\lambda$ is the wavelength of diffracted radiation, d is the d-spacing of the multilayer optic, and $\theta$ is the incident angle and exit angle.

Kirkpactrick-Baez (P. Kirkpactrick and A. Baez, V. 1948, *Journal of the Optical Society of America*, 38, pp. 766) introduced an optical focusing scheme which independently collimates a beam of x-rays in two dimensions by employing two, two dimensional orthogonal optics in series. The cross coupling of the optic mirrors will be discussed in more detail in a subsequent section of this disclosure. Multilayer optics have also been incorporated in the mirrors. The Kirkpactrick-Baez (K-B) system, therefore, shapes and partially monochromatizes the beam and enhances the beam intensity for a given x-ray source strength. The K-B system suffers from several shortcomings. Both mirrors cannot be installed at an optimum position since the mirrors cannot be coincident as will be subsequently illustrated. The resultant differences in focal lengths lead to decreased beam flux and increased aberration. Since the source and the mirrors are aligned in series, one mirror will collect radiation from the source at a smaller angle. In addition, aberrations of the mirror nearest the source will be larger than the more distant mirror. With a finite source of x-radiation, the K-B system provides a beam with divergence in two directions, producing a rectangular beam cross-section. The diffraction spot from a beam conditioned in this manner tends to be large, decreasing detection resolution by a detector of x-radiation which interacts with a sample exposed to the beam. Increasing the sample to detector spacing distance will improve sample resolution, while decreasing the detector's angle of acceptance. For a given set of mirrors, the focal length of the K-B system is fixed. Focal length can be changed by mechanically varying the curvature, and thus the focal length, of each orthogonal mirror.

A K-B focusing system with two elliptical mirrors in series has been employed to generate a more sharply focused beam approaching a point source. More specifically, for a point source of x-rays, a point source beam can be generated with a K-B system employing elliptical mirrors. For an object, the image will be magnified or demagnified by the system. Since the mirrors are different distances from the sample object, magnification of the beam at the sample object will be different and, therefore, from a rectangular focal spot as will be subsequently illustrated. For given mirrors, the focal length of the system is constant, and can be changed only by varying the curvature of each mirror.

Thathachari (Y. T. Thathachari, 1953, *Proceedings of the Indian Academy of science*, A, 37, pp. 41) proposed a system with two mirrors arranged orthogonally and side-by-side rather than in series. The divergence of a beam reflected by this technique will be the same if parabolic mirrors are used. Magnification will be the same in both directions if elliptical mirrors are used. This eliminates some of the focusing problems of serial K-B mirrors as previously discussed. Multilayer mirrors have also been used with this side-by-side arrangement to further monochromatize the focused beam. Beam flux is increased, surface imperfections in the mirrors have less adverse impact, and beam divergence decreases thereby improving final resolution of radiation interacting with an exposed sample and sensed by a detector system. The system suggested by Thathachari is formed with two optics mounted orthogonally and side by side. This causes some difficulty in aligning the mirrors, increases the fabrication cost, and yields an apparatus which is somewhat susceptible to misalignment or breakage in use in hostile environments. Furthermore, the focal length of the beam generated by this arrangement cannot be varied for a given set of optics.

In summary of the prior art optics used to form a focused beam of x-rays offer variable focusing in a single plane. Prior art optics employing two orthogonal mirrors in series can be varied in focal length, but require two focusing mechanisms so that each mirror can be mechanically distorted as required. Stated another way, if two plane focusing is desired, then two optics and two focusing mechanisms are required. Fixed focus with two optical planes are also available in the prior art in the form of two, orthogonal side-by-side mirrors. Although the side-by-side arrangement offers advantages over the serial mirror arrangement, it does not offer variable focusing.

SUMMARY OF THE INVENTION

In view of the above discussed prior art, an object of the present invention is to provide an optical focusing device for x-radiation employing two, orthogonal side-by-side mirror surfaces, wherein the focal length of the device can be readily varied as required by the user.

An additional object of the present invention is to provide an optical focusing device for x-rays which can be fabricated as a single optic from a single piece of material thereby reducing manufacture cost and increasing reliability.

Yet another object of the present invention is to provide a single optic focusing device which focuses an x-ray beam in two dimensions and which includes a single focusing mechanism used to vary the focal length of the device.

An optional object of the present invention is to provide an optical focusing device for x-rays which is fabricated as a single optic, which incorporates multilayer diffraction to monochromatize the focused beam, and wherein the focal length can be varied by the user.

The optical focusing device of the present invention is fabricated from (1) a monolithic block of optical material such as quartz crystal or the like or (2) from joining two precut blocks at a seam at the groove. In the latter instance, the faces are joined below the groove. Other materials that are well known for the use in optical lenses can be selected. A groove is cut into the monolithic block preferably in the form of a "V" groove comprising first and second orthogonal, active surfaces. The active surfaces are finished and coated so that they are optically reflective, or can be coated with material forming a multilayer surface so that they are optically diffractive. The active surfaces thereby form two side-by-side mirrors which are preferably at right angles to one another in a geometry discussed above. The V groove is preferably symmetrical and located equally between top and bottom faces of the monolithic block. The groove is deployed with both faces at a common angle with respect to the outside faces of the rectangular body. Furthermore, the length of the groove is relatively large with respect to the depth of the groove as will be illustrated in a subsequent section. It is not necessary that the groove be quite large, considering the focusing device is normally used to focus an x-ray source which has been precollimated to provide incident radiation approaching a point source. The monolithic block is made sufficiently large that the formation of the groove in the block does not weaken the block structurally. While the groove is cut to a requisite depth, the thickness of the body is such that the body is able to withstand the stresses which will be discussed below in describing use of the block of optical lens material.

Attention is now directed to the variable focal length feature of the focusing device. The device is constructed as noted above with the shapes mentioned, and is constructed with no internal stresses in the monolithic body. As a result, the active V groove surfaces of the unstressed monolithic body are planar and are found in planes which are at right angles or parallel to each other. To vary the focal length of the device, the monolithic body is stressed, but the stress is applied in a particular fashion. A rigid mounting member contacts the back face of the monolithic body at a point near or at each end of the elongated body, and opposite the V groove. The monolithic body is supported on the opposite side by one or more supports which are positioned between the mounting contact points on the back face of the block. The mount member provides a load on the monolithic body which, when cooperating with the opposing supports, curves the body and the V groove therein in a concave fashion. The supports do not move. Flexure occurs so that the monolithic body is bent into a radius of curvature. Since the entire body yields to this loading force, the active surfaces are also bent. When they are bent, they collectively cooperate so that a focus of the beam is obtained with a focal length dependent upon the amount of bending. This collects a sufficient amount of the x-radiation for appropriate illumination of a target sample, which is located on the side of the focusing device opposite the source of x-rays. The sample therefore receives of adequate x-ray flux for making the desired crystallographic observations.

The active surfaces of the V groove are controllably bent with the monolithic body as a function of force applied to the mount member. The reflecting, or alternately refracting active surfaces, can be reshaped dynamically thereby dynamically varying the focal length of the beam as required by the user. When this occurs, the reshaped pair of reflective surfaces then cooperate to gather x-rays from the source and focus them to the desired focal point. Parabolic distortion of the active V groove surfaces is created over preferably a linear range, wherein the amount of curvature increases approximately in proportion to the force applied to the mounting member. Obviously, over stressing can ultimately result in physical failure of the optical element and it is not intended that the system exceed suitable force levels.

BRIEF DESCRIPTION OF THE DRAWINGS

So that the manner in which the above recited features, advantages and objects of the present invention are attained can be understood in detail, more particular description of the invention, briefly summarized above, may be had by reference to the embodiments thereof which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

3. Prior Art

Advantages of two mirror, focusable system of the present disclosure is enhanced by initial discussion of prior art two mirror arrangements.

Figure 1:
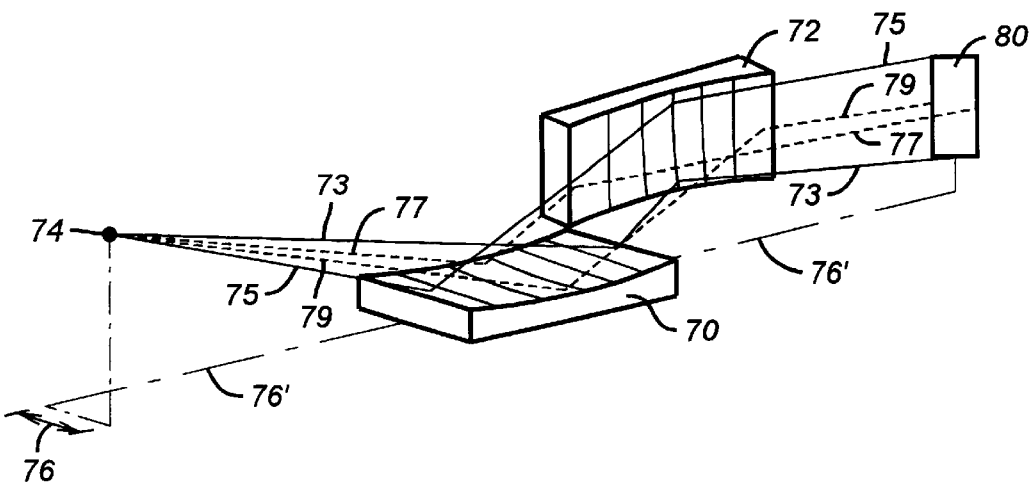
FIG. 1 is a prior art arrangement of separate mirrors deployed to form a rectangular cross section beam in accordance with the Kirkpactrick-Baez optic system.

FIG. 1 shows a first mirror 70 and a second mirror 72 which are orthogonal and which are serially offset lengthwise from each other. This system is arranged in accordance with the traditional K-B optical scheme discussed previously. The two mirrors 70 and 72 are therefore independent of each other, and are preferably concave in construction. The mirrors are optically coupled in a sequence so that the first mirror 70 reflects the radiation from an x ray source 74 to the second mirror 72. The concave surfaces are formed of solid blocks of optical material, typically quartz, and they are cut and polished so that the reflective surfaces have a high quality smooth finish. The finish is sufficient to provide optical reflection in accordance with the teachings of Kirkpactrick-Baez. The ray paths 73, 75, 77 and 79 define a rectangular beam spot 80 as illustrated. The source 74 is axially displaced a distance 76 from the axis 76' bisecting the mirror 70 and the beam cross section 80. Structurally, the two mirror components 70 and 72 pose a serious problem. Each of the two optical members is individually and uniquely mounted. They must move independently and are repositioned with at least two degrees of freedom. Typically, this requires an extremely complicated mounting mechanism to hold them in space. The mirror system must then be positioned with respect to the source 74 and the desired target or focal area 80. In effect, this requires a relatively complicated mechanical system. Moreover, it is a system which has a fixed focal length in that each concave surface of the mirrors 70 and 72 has a radius which is fixed. It is not able to gather light except in accordance with the fixed construction of the optical elements. These optical elements are cut with the concave surface which is optimum for one wave length, but it is not adaptive in other aspects. The focal length of the system shown in FIG. 1 can be varied only by mechanically distorting or bending each mirror 70 and 72. This requires two bending mechanisms, which adds complexity, cost, and operational problems to an already complex optical focusing system.

Figure 2:
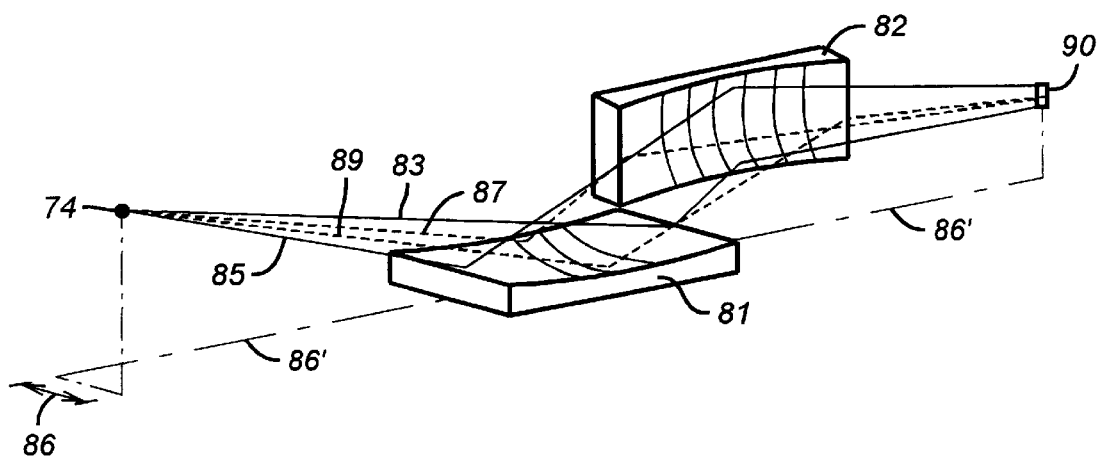
FIG. 2 is a similar prior art mirror system to that shown in FIG. 1 which provides a square beam cross section.

FIG. 2 shows a different construction of a prior art focusing device, namely one in which the two optical surfaces 81 and 82 are the radius of curvature of a large sphere and thereby provides some measure of refocusing. While FIG. 1 provides a rectangular focal area, the arrangement of FIG. 2 provides a smaller square area 90 for the focus as defined by the ray paths 83, 85, 87 and 89. The source 74 is offset from an axis 86' by a distance 86. The devices of FIG. 1 and FIG. 2 are similar in concept, but differ in that the area of the focal spot 90 of the FIG. 2 device. With regard to the two mirrors in the arrangement shown in both FIGS. 1 and 2, the two optical elements again must be mounted with a control system which fixes them in place, yet one which adjusts so that remounting can be obtained readily. By appropriate adjustments, some range of differences can be accommodated.

Figure 3:
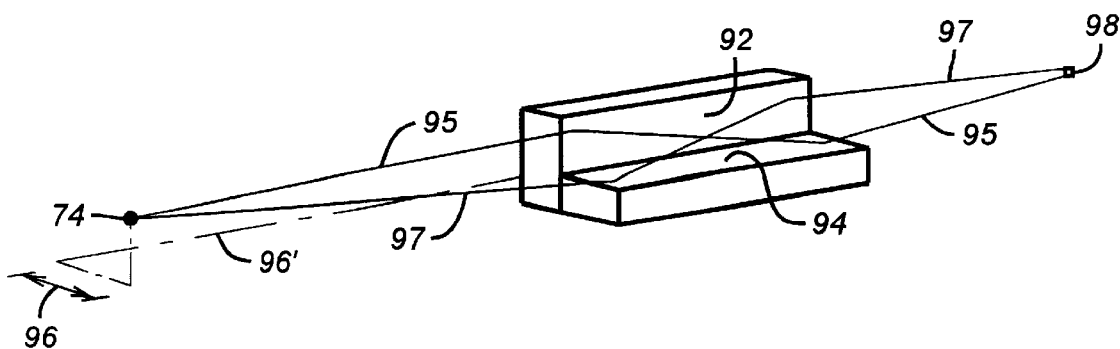
FIG. 3 is another beam focusing system in accordance with the teachings of Tathachari, and represents another prior art system for X-ray beam focusing.

FIG. 3 shows a prior art embodiment of the side-by-side two mirror system. Active surfaces 92 and 94 are typically fabricated from two different pieces and mounted orthogonally. Ray paths 95 and 97 reflect from the active surfaces to form a square spot 98. The source 74 is displaced a distance 96 from axis 96'. The focal length of the system is not variable, and is defined by the spacing of the elements and the shape of the active surfaces.

4. Detailed Description of a First Construction

Figure 4:
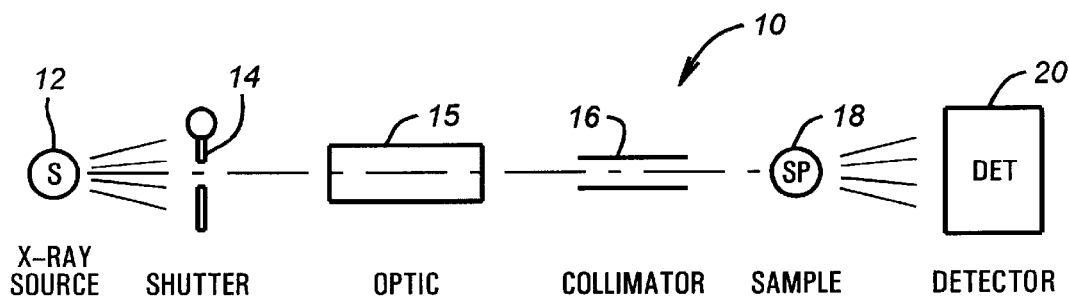
FIG. 4 is a functional deployment of components set up in a x-ray crystallography system.

Attention is now directed to FIG. 4 of the drawings which shows a X-ray crystallographic 10 system in accordance with this disclosure. Proceeding from the left, the numeral 12 identifies an x-ray source. Typically, the source can be a pulsed x-ray source although a continuous wave (CW) source can be used. Typically, the output is a CW. This of course depends on the duty cycle of the source 12. To provide representative values, the source 12 provides an output signal with a wave length of about 0.2 to about 3.0 angstroms (A). There may be reasons to operate in this range, and there may be reasons to operate at frequencies outside this range.

Still referring to FIG. 4, part of the radiation from the source 12 is output through a shutter 14. The shutter is open for a fraction of a second. Even with a CW radiation source, the shutter is closed most of the time. The shutter is used to trim or cut the radiation exposure to a specified timed interval. This controls the illumination of the target without necessitating the source 12 to be turned on and turned off repeatedly. Representative duty cycles can range from milliseconds down to one micro-second or even less is certain circumstances. The peak amplitude of x-radiation from the source 12 can have an instantaneous value of any suitable measure from the smallest achievable output power up to powers as high as $10^6$ watts. As is well understood, power pulses are timed with a specified film or detector operation so that the levels of illumination are appropriately timed for the circumstances. The output x-radiation from the source 12 is an incoherent emission. After passing through focusing optic 15, which will be discussed in detail below, focused x-rays are directed through a collimator 16 and impinge upon a target sample 18. The collimator 16 is used to absorb any multiple scattered x-radiation and to minimize background radiation. The x-radiation then interacts with the target sample 18 and is subsequently detected with a suitable detector 20 for analysis. More specifically, FIG. 4 shows the optic 15 cooperative with the collimator 16 which directs the beam through the sample 18 and then to the target detector 20. The detector 20 makes observations in accordance with the scattering of the beam as a result of passing through the sample 18. The shape and structure of the crystal in the sample 18 can be evaluated by observation of the diffraction of the beam. The scattered beam is recorded at the detector 20.

Figure 5A:
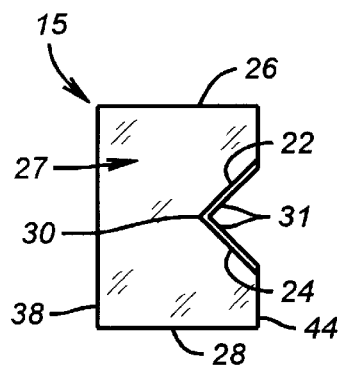
FIGS. 5a and 5b show an end view and a side view, respectively, of an optical focusing element constructed with a pair of facing polished surfaces formed in a common body which is shown in views at right angles.

Attention is now directed to the optic element 15. A monolithic block 27 of optical material is shown in FIG. 5a. The optical element 15 comprises the monolithic block of optical material such as quartz crystal or the like. Other materials that are well known for the use in optical lenses can be selected. The block 27 element of the optic shown in FIG. 5a is a elongate block which has a first reflective surface 22 cooperative with a second reflective surface 24. These surfaces are cut within the block 27 in the form of a "V" groove, and form the opposing faces of the V-shaped groove. The faces 22 and 24 are preferably at right angles to each other. The V groove is preferably symmetrical, located equally between the top and bottom faces 26 and 28 of the block 27. The apex of the groove is shown at 30. The groove is deployed with both faces at a common angle with respect to the outside faces of the rectangular body, with that angle preferably being 45 degrees with respect to face 44 of the block 27 which will be defined as the "front" face of the block.

Figure 5B:
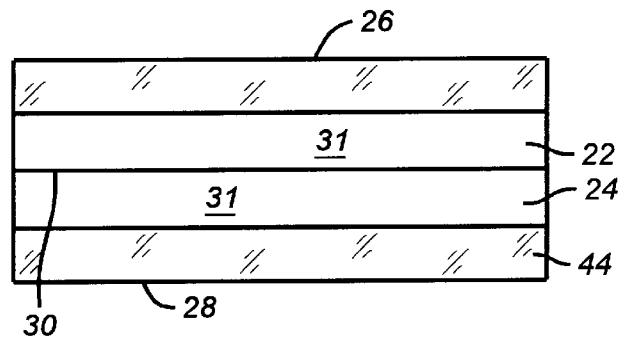

The length of the block 27, as shown in FIG. 5b, is relatively long in comparison with the depth of the groove as shown in FIG. 5a. The length of the block in this context refers to a block 27 which is anywhere between about 2 and 8 inches. An optimum length is about four inches when used with most crystallographic test devices. It is not necessary that the groove be quite large. Considering the size of the x-ray source 12 (see FIG. 4) which is treated as a point source, the groove preferably has a depth anywhere between about 0.0625 inches and about 0.5 inches. The block 27 is made sufficiently large that the formation of the groove in the block does not weaken the block structurally. While the groove is cut to a requisite depth, the thickness of the body is such that the body is able to withstand the stresses which will be discussed below in describing use of the block of optical lens material. The two active faces 22 and 24 are polished. Typically, this involves formation of the groove first and then polishing of the two faces. Thereafter, the polished faces are provided with a coating 31. The coating material can be reflective material. Typically, this involves a metalized deposit which is placed on the surfaces 22 and 24 in a sputter chamber. This metal surface deposition placed on the surfaces 22 and 24 enhances the reflective surface.

Alternately, the faces can be coated with multilayer refractive material 31.

Figure 6A:
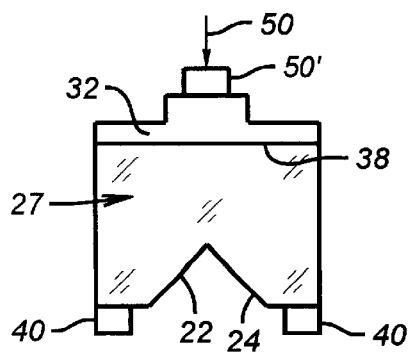
FIGS. 6a and 6b show an end view and a side view, respectively, of a bending apparatus for use with the optical body of FIG. 5, wherein the body is curved to thereby change the planar reflective surfaces to enable focusing to a desired shaped focal point.
Figure 6B:
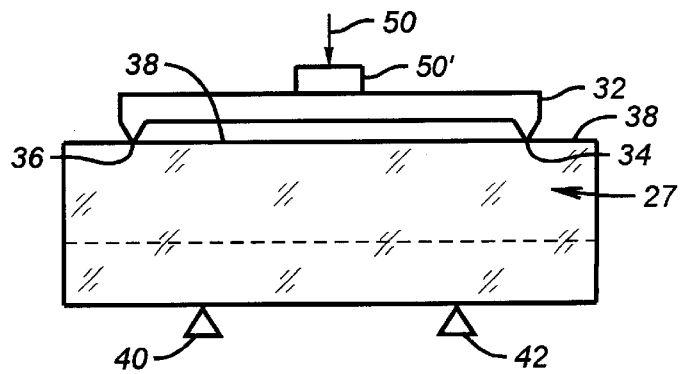

Attention is now directed to FIGS. 6a and 6b considered jointly, which depict the mounting system for the optical focusing device. The optical device 15 is constructed as noted above with the shapes mentioned, and is constructed with no internal stresses in the block 27. As a result, the surfaces 26, 28, 38 44, 22 and 24 of the unstressed body are planar and are found in planes which are preferably either at right angles or parallel to each other. For instance, the side faces 26 and 28 are parallel. FIGS. 6a and 6b show a method of mounting the block 27 for controlled deformation which varies the focal length of the device. To vary the focal length, the optic 15 is stressed, but the stress is applied in a particular fashion. A rigid mounting member 32 includes contact points 34 and 36. These contact points bear against the back face 38 of the optic element 15. The back 38 is a planar surface as identified in FIG. 5a as well as FIGS. 6a and 6b. The surface 38 thus serves as the mounting region for preferably knife edges 34 and 36 extending from the mounting member 32. A force or "load", depicted conceptually by arrow 50, is applied to the mounting member 32 through a force contact member 50'. The force 50, acting through the edges 34 and 36, provides a load on the body 15 which curves the body in a concave fashion. The edges 34 and 36 are outside support edges at 40 and 42 which contact the face 44 of the block 27. The edges 40 and 42 are structure support points. Since they are immovable or fixed and are located inside of the spacing of the knife edges 32 and 36, flexure occurs so that the block 27 is bent into a radius of curvature. Since the entire body 15 yields to the force 50, the exposed top face 44 is bent into a parabolic shape. When this face becomes parabolic, the reflective surfaces 22 and 24 also are bent as will be shown more clearly in subsequent FIGS. 7a, 7b and 7c. When they are bent, they collectively cooperate so that a focus of the beam is obtained with a focal length dependent upon the amount of bending. This collects a sufficient amount of the x-radiation for appropriate illumination of the target sample 18 which is located on the side of the focusing device 15 opposite the source 12 of x-rays as shown in FIG. 4. The sample 18, therefore receives of adequate x-ray flux for making the desired crystallographic observations.

Figure 7A:
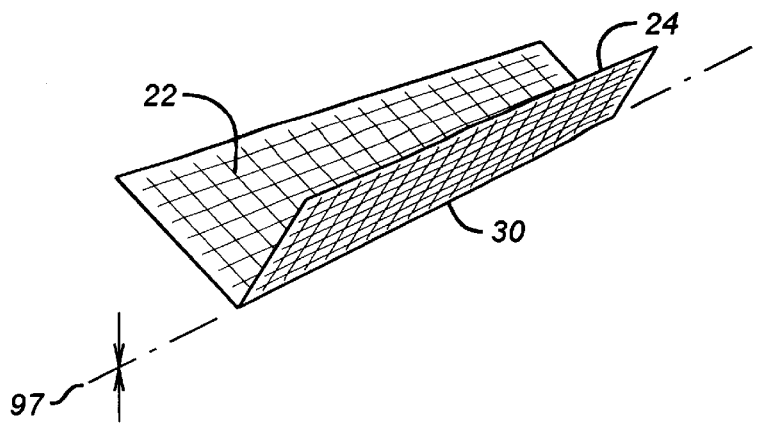
FIGS. 7a, 7b and 7c respectively illustrate active surfaces of the focusing device with no force applied, with a first force applied, and with a second force applied, wherein the second force is greater than the first force.
Figure 7B:
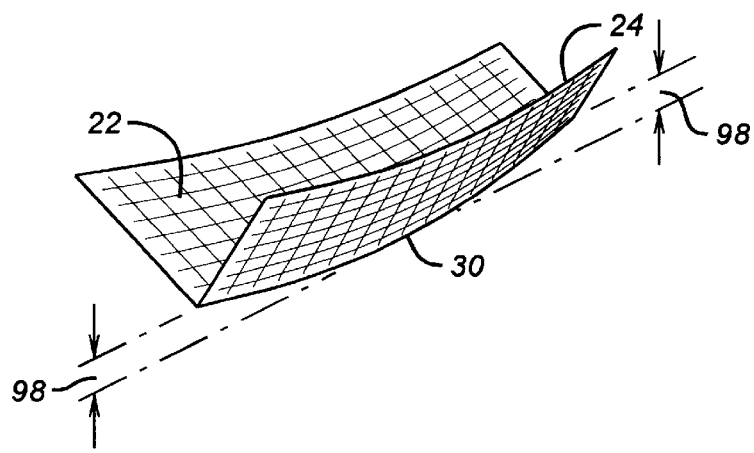
Figure 7C:
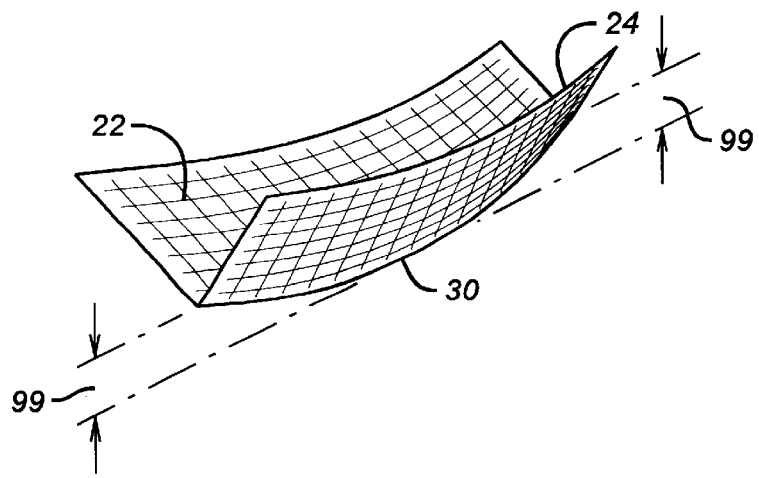

The active surfaces 24 and 22 of the V groove are controllably bent with the monolithic body 27 as a function of force 50 applied to the mount member 32. This concept is illustrated in FIGS. 7a, 7b and 7c. In these figures, only the active surfaces 22 and 24 are shown for purposes of clarity. The degree of bending is also greatly exaggerated in magnitude to illustrate the concept of dynamically variable focal length. The reflecting, or alternately refracting active surfaces 22 and 24, can be reshaped dynamically thereby dynamically varying the focal length of the beam as required by the user. In FIG. 7a, no force 50 is applied, and the apex 30 of the groove is straight and the surfaces 22 and 24 are planar. The dimension 97 is "null" or zero. In FIG. 7b, a force 50 is applied. When this occurs, the surfaces 22 and 24 are reshaped and the groove apex 30 is concaved by a dimension represented by the distance 98. The surfaces 22 and 24 then cooperate to gather the x-radiation from the source 12 and focus the radiation a focal length shorter than the focal length of the configuration shown in FIG. 7a. Parabolic distortion of the active V groove surfaces 22 and 24 is created over preferably a linear range, wherein the amount of curvature increases approximately in proportion to the force 50 applied to the mounting member 32. This is illustrated in FIG. 7c, which illustrates distortion of the surfaces 22 and 24 when a force 50 greater than that in FIG. 7b is applied. The bending of the groove apex 30 is enhanced, as illustrated by the distance 99 which is greater than the distance 98. Likewise, as the distortion of the surfaces 22 and 24 in also enhanced. The resulting focal length of the system in this configuration is even shorter than the focal length of the system in the state shown in FIG. 7b. Obviously, over stressing can ultimately result in physical failure of the optical element and it is not intended that the system exceed suitable force levels.

5. Summary

The surfaces 22 and 24 controllably bend with the optical body 15 with increasing or decreasing force 50. They can be reshaped dynamically as required. When this occurs, the reshaped pair of reflective surfaces then cooperates to gather x-rays from the source and to focus them at the desired location. In the deployment of the invention 10, by adjustment of the force 50 which is applied by the mounting equipment 32, the curvature in the optical element 15 is changed as illustrated conceptually in FIGS. 7a, 7b and 7c. When initially installed without any force, the optical element is straight. That is, the mirrored surfaces 22 and 24 are also uncurved or straight. The mirrored surfaces are bent along the optical body 15 by increasing the force 50. The parabolic distortion is created over a linear range, wherein the amount of curvature increases approximately in proportion to the force 50 applied and the focal length decreased in proportion to the force applied. The advantages of the side-by-side mirror configuration are obtained with the present invention. In addition, the focusing optic is made from a single monolithic block thereby decreasing cost and increasing reliability. Variable focus lengths are obtainable from a single distortion focusing mechanism. In addition, coatings 31 used to fabricate the active surfaces 22 and 24 can be reflecting, refracting or multilayer surfaces.

The drawings in the present disclosure especially include a schematic representation in FIG. 4 of the entire system. Reading from the left, there is an x-ray source as previously noted, and it cooperates with a shutter which then operates in conjunction with an optical system. The present disclosure can readily be installed so that all of the components which are deployed in FIG. 4 are integrated with the components of the present disclosure, and in particular the new and improved optical systems shown in this disclosure.

By judicious installation of the supportive equipment involved in the mirror system of this disclosure, a suitable system can be set forth diagnostics. It works with an x-ray source 12 (see FIG. 4 again) and that in turn cooperates with the shutter 14, the optical system 15, the collimator 16 and then all of this equipment connects appropriately to provide radiation into and through the sample 18. Then, there will be radiation impinging on the sample of the system. The impinging radiation on the sample 18 provides the detector 20 with the output that is characteristic of the system when it operates in the described manner. It may be appropriate to use a detector 20 or substitute a film recording device. In both instances, it is possible to obtain the indicative patterns. These are used in diagnostic analysis of the construction and make-up of the sample, and in particular, the crystalline structure.

While the foregoing is directed to the preferred embodiment of the invention, the scope thereof is determined by the claims which follow.

What is claimed is:

1. An optical device for focusing x-radiation, the device comprising:

(a) a block of optical material partly defined by a front surface;

(b) a groove within said front surface comprising opposing faces at a common angle with said front surface; and (c) means for deforming said groove thereby defining a focal length of focused x-radiation optically interacted with said groove.

2. The device of claim 1 wherein said block further comprises:

(a) a back surface spaced from said front surface; and (b) said back surface is parallel to said front surface; wherein (c) said means for deforming said groove applies force to said block at said back surface.

3. The device of claim 2 wherein said means for deforming said groove comprises:

(a) a mount member and two knife edges, wherein a knife edge is affixed at two opposing sides of said support member, and wherein each of said knife edges contacts said back surface;

(b) a force contact member affixed to said mount member and on an opposite side from said knife edges and between said knife edges; and (c) two support edges contacting said front surface at positions inside said knife edges; wherein (d) said groove is deformed by applying a force to said force contact member.

4. The device of claim 2 wherein:

(a) said block further comprises a monolithic block between a top face and a bottom face;

(b) said top face and said bottom face are parallel and perpendicular to said front surface; and (c) said opposing faces of said groove
  (i) are at 90 degrees with respect to each other,
  (ii) each is at a 45 degree angle with said front surface,
  (iii) form an apex intersection within said monolithic block, and
  (iv) said apex intersection is parallel to and midway between said top face and said bottom face.

5. The device of claim 1 further comprising a coating applied to said surfaces of said groove.

6. The device of claim 5 wherein said coating is evenly applied.

7. The device of claim 5 wherein said coating comprises a reflecting material.

8. The device of claim 5 wherein said coating comprises reflecting material.

9. The device of claim 4 wherein said monolithic block has a length of about four inches, and said groove has a depth so that said apex intersection is displaced from said front surface by about 0.0625 inches to about 0.5 inches.

10. An method for focusing x-radiation comprising the steps of:

(a) fabricating a groove in a block of optical material;

(b) fabricating opposing faces of said groove at a common angle with a front surface of said monolithic block; and (c) deforming said groove thereby defining a focal length of x-radiation optically interacting with said groove.

11. The method of claim 10 comprising the additional steps of:

(a) fabricated said monolithic block with a back face defined by a back surface, wherein said back surface is parallel to said front surface; and (b) deforming said groove by applying force to said monolithic block at said back surface.

12. The method of claim 11 comprising the additional steps of applying said force to deform said groove by:

(a) contacting said back surface of said monolithic block with two knife edges affixed to a support member;

(b) supporting said front surface with two support edges which contacting said front surface at positions inside said knife edges; and (c) applying said force to said support member between said knife edges and also between said support edges thereby deforming said groove.

13. The method of claim 11 comprising the additional steps of:

(a) providing said monolithic block which comprises a top face and a bottom face, wherein said top face and said bottom face are parallel and perpendicular to said front surface; and (b) fabricating said grooves
  (i) with said opposing faces at 90 degrees with respect to each other, and
  (ii) with each said opposing face at a 45 degree angle with said front surface and forming an apex intersection within said monolithic block which is parallel to and midway between said top face and said bottom face.

14. The method of claim 10 further comprising the step of applying a coating to said opposing surfaces of said groove.

15. The method of claim 14 wherein said coating is applied by sputtering.

16. The method of claim 14 wherein said coating comprises an x-radiation reflecting material.

17. The method of claim 14 wherein said coating comprises an x-radiation reflecting material.

18. The method of claim 13 wherein said monolithic block has a length of about four inches, and said groove has a depth so that said apex intersection is displaced from said front surface by about 0.0625 inches to about 0.5 inches.

19. The method of claim 11 wherein said focal length is a function of magnitude of said applied force.

20. An x-radiation crystallographic system comprising:

(a) a shutter which is opened and closed to allow x-radiation to pass there through when opened thereby forming pulses of xradiation; and (b) an optical focusing device responding to said pulses impinge and comprising
  (i) a block of optical material with a front surface,
  (ii) a groove within said front surface comprising opposing faces at a common angle with said front surface and upon which portions of said pulses optically interact, and
  (iii) means for deforming said groove with a force thereby focusing said optically interacting pulses which emerge from said focusing device as output pulses with a focal length defined by a magnitude of said force.

21. The system of claim 20 further comprising a collimator through which said output pulses pass to minimize multiple scattered xradiation and background radiation.

22. The system of claim 21 further comprising a target detector which measures effects of said output pulses interacting with a sample.

23. The system of claim 20 wherein said pulses optically interact by reflection.

24. The system of claim 20 wherein said pulses optically interact by refraction.

25. A method for providing pulses of focused x-radiation, the method comprising the steps of:
   (a) impinging continuous wave x-radiation upon a shutter which is opened and closed to allow x-radiation to pass there through when opened thereby forming pulses of x-radiation;
   (b) impinging said pulses onto a groove within a block of optical material, wherein said pulses optically interact with opposing face surfaces of said groove and emerge as focused output pulses; and
   (c) relatively distorting the groove to thereby change the focused output of the groove interacted pulses.

26. The method of claim 25 comprising the additional step of passing said output pulses through a collimator to minimize multiple scattered x-radiation and background radiation.

27. The method of claim 25 wherein said pulses optically interact by reflection.

28. The method of claim 25 wherein said pulses optically interact by refraction.

29. The method of claim 25 including the step of directing the pulses after optical interaction with the groove as a reinforced beam, and recording data regarding said beam.

30. The method of claim 25 including the step of making relative adjustments involving the groove and beam into dimensions at right angles.

* * * * *